United States Patent [19]

Winner

[11] Patent Number: 4,600,754

[45] Date of Patent: Jul. 15, 1986

[54] PHOSPHATE EPOXY ACRYLIC COPOLYMERS

[75] Inventor: Peter P. Winner, North Royalton, Ohio

[73] Assignee: SCM Corporation, New York, N.Y.

[21] Appl. No.: 608,903

[22] Filed: May 10, 1984

Related U.S. Application Data

[63] Continuation-in-part of Ser. No. 495,703, May 18, 1983.

[51] Int. Cl.⁴ ............................................. C08F 283/10
[52] U.S. Cl. ..................................... 525/531; 525/523
[58] Field of Search ................................. 525/530, 531

[56] References Cited

U.S. PATENT DOCUMENTS

| | | | |
|---|---|---|---|
| 3,674,545 | 7/1972 | Strolle | 525/531 |
| 4,131,633 | 12/1978 | Doorakian et al. | 525/530 |
| 4,212,781 | 7/1980 | Evans et al. | 525/69 |
| 4,308,185 | 12/1981 | Evans et al. | 525/523 |
| 4,434,278 | 2/1984 | Skiscim | 525/531 |

*Primary Examiner*—John C. Bleutge
*Assistant Examiner*—Robert E. L. Sellers, II
*Attorney, Agent, or Firm*—Thomas M. Schmitz

[57] ABSTRACT

Water dispersed phosphated epoxy-acrylic polymers are produced by first producing an epoxy phosphate followed by in-situ polymerization of ethylenically unsaturated monomers, including carboxyl monomers, in the presence of the epoxy phosphate and utilizing at least 3% peroxide catalyst based on the weight of monomers.

39 Claims, No Drawings

PHOSPHATE EPOXY ACRYLIC COPOLYMERS

BACKGROUND OF THE INVENTION

This application is a continuation-in-part of Ser. No. 495,703 filed May 18, 1983, and the disclosure thereof is incorporated herein by reference.

This invention relates to polymeric compositions particularly useful for surface coating compositions, and more particularly relates to water dispersed epoxy phosphate acrylic copolymers particularly suitable for use as a water-based coating compositions for the interiors of steel cans such as soft drink or beer cans, and similar sanitary can coating applications.

Epoxy resins are particularly desirable for use in surface coating materials as a vehicle or polymeric binder for pigments, fillers, and other additives whereby epoxy resins advantageously provide toughness, flexibility, adhesion, and chemical resistance. Water-dispersed coating compositions containing epoxy resins are highly desirable for can coating compositions. Coatings for soft drink and beer cans, for instance, are critical due to taste sensitivity and sanitary can coatings must not alter the product taste of canned beverages. Taste problems can occur in a variety of ways such as by leaching of coating components into the beverage, or by adsorption of flavor by the coating, or sometimes by chemical reaction, or by some combination thereof. In commonly assigned U.S. Pat. No. 4,212,781, a process is disclosed for modifying epoxy resin by reacting the epoxy resin with addition polymerizable monomer in the presence of at least 3% by weight based on monomer of benzoyl peroxide (or the free radical initiating equivalent thereof) at a suitable reaction temperature. This reaction produces a reaction mixture containing an in-situ formed blend of resinous materials comprising an epoxy-acrylic copolymer mixture containing epoxy resin, graft epoxy-acrylic polymer, and associatively-formed ungrafted addition polymer. The in-situ polymerized monomers include acid functional monomers to provide acid funtionality in the epoxy-acrylic reaction mixture sufficiently high to effect stable dispersion of the resulting reaction product in a basic aqueous medium. In a preferred embodiment of U.S. Pat. No. 4,212,781, a polyglycidyl ether of bisphenol-A is reacted with a mixture of addition polymerizable monomers containing an acrylic acid such as methacrylic acid wherein the epoxy resin has a molecular weight above 4,000 and provides from 50% to 90% of the initial reaction mixture. The reaction takes place in the presence of benzoyl peroxide at an elevated temperature above 80° C. and preferably between about 110° C. and 130° C. to effect addition polymerization of the monomer and produce addition polymer grafted to the epoxy resin. The reaction product can be dispersed in a basic aqueous medium to form a water-reducible epoxy-acrylic copolymer mixture.

It now has been found that an epoxy-acrylic copolymer mixture, preferably an epoxy-acrylic graft copolymer mixture, coreacted with a source of phosphoric acid provides a highly desirably epoxy-acrylic phosphate ester particularly useful as a binder component, an additive, or a wetting agent in polymeric binder systems for protective coatings. In one aspect of this invention, epoxy resin can be advanced in molecular weight and then reacted with phosphoric acid to provide a high molecular weight phosphated epoxy polymer. The phosphated epoxy polymer can be used as an excellent grafting base for in-situ copolymerization of ethylenically unsaturated monomers, including carboxyl monomers, in the presence of at least 3% by weight peroxide catalyst based on monomer weight. The resulting in-situ formed copolymers provide an excellent epoxy-acrylic copolymer mixture suitable for use as the binder in water dispersed coating compositions. In another aspect of the invention, the high molecular weight epoxy resin can be coreacted with ethylenically unsaturated monomers, including carboxyl monomers, by in-situ polymerization in the presence of at least 3% by weight of a peroxide catalyst to produce an in-situ formed polymeric mixture comprising epoxy-acrylic copolymer mixture, preferably including a graft copolymer, where the epoxy-acrylic copolymer mixture is subsequently phosphated to produce an epoxy-acrylic phosphate ester. The resulting phosphate ester is particularly useful as a binder component or wetting agent additive to other polymer binders to provide excellent adhesion over poorly cleaned or poorly prepared substrates, such as metal substrates.

The polymeric compositions produced in accordance with this invention are particularly useful as polymeric binders or additives to other polymeric binders for use in coating compositions on metal substrates such as beverage cans. The polymeric compositions of this invention can be easily water-dispersed in water with an ionizing agent such as a base material. A cross-linking polymer or resin such as an aminoplast resin can be added to provide a thermosetting cure to the coating composition. In use, the material can be spray or otherwise applied to a metal surface and cured under heat whereupon the water and amine volatilizes from the surface and the remaining polymeric compositions cross-link with the melamine resin to provide a thermoset coating. The paint films particularly exhibit corrosion resistance and solvent resistance and provide excellent protection for steel can substrates for containing soft drink beverages. These and other advantages such as water-dispersibility, extended stability, inertness to foods, no taste transfer, as well as improved film integrity properties can be achieved by coatings of this invention, and will become more apparent by referring to the detailed description of the invention and the illustrative examples.

SUMMARY OF THE INVENTION

Briefly, the invention pertains to a phosphated high molecular weight epoxy-acrylic copolymer mixture wherein epoxy phosphate or epoxy resin is coreacted with ethylenically unsaturated monomers, including carboxyl monomers, by in-situ polymerization of the monomers in the presence of the epoxy resin or epoxy phosphate by using at least 3% peroxide catalyst by weight based on the weight of the monomers, or the free radical initiating equivalent thereof to produce an epoxy-acrylic phosphate ester. The epoxy resin can be phosphated before or after the in-situ polymerization step.

DETAILED DESCRIPTION OF THE INVENTION

In accordance with this invention, a high molecular weight epoxy resin is coreacted with ethylenically unsaturated monomers by in-situ polymerization of the monomers in the presence of the epoxy resin, wherein the epoxy resin is either prereacted or post reacted with a phosphoric acid source to produce an epoxyacrylic phosphate ester.

Referring first to the high molecular weight epoxy resin, conventional epoxy resin is first advanced in molecular weight by reacting low molecular weight epoxy resin with additional amounts of bisphenol-A. The most preferred epoxy resins are polyglycidyl ethers of bisphenol A, especially those having 1,2-epoxy equivalency of from about 1.3 to about 2. The molecular weight should be from about 350 to about 20,000, and for sanitary coating compositions, should be above 4,000 and preferably from about 4,000 to about 10,000. When the in situ polymeric blend contains from 50% to b 90% by weight of epoxy resin based on total polymer solids, the epoxy resin selected should have a molecular weight in the range from about 4,000 to about 10,000, particularly for the preparation of sanitary coating compositions. Molecular weights can be measured by GPC (gel permeation chromatography). Although high molecular weight commercial epoxy resins are sometimes convenient to use, a more practical method is to start with bisphenol A and the diglycidyl ether of bisphenol A, whereby the molecular weight of a liquid epoxy resin can be increased to a level that is more satisfactory for many coating applications by reacting liquid epoxy resin with additional bisphenol A or other polyalcohol materials.

The high molecular weight epoxy resin, ordinarily a mixture of monoepoxide and diepoxide, can have a molecular weight in the range from about 350 to 20,000. Some of this epoxide is desirably a diepoxide in order to increase the molecular weight and complexity of the final copolymer. In preferred practice, the epoxy resin is a mixture including aromatic polyether devoid of oxirane functionality as well as aromatic polyether having a single oxirane group and aromatic polyether having two oxirane groups. This mixture of epoxy functionality maximizes compatibility, although the aromatic polyether devoid of oxirane functionality can be added later and heated and agitated to enhance the intimacy of the association between the various components. The epoxy polymer can be conventional epoxy polymers produced by a condensation reaction of epichlorohydrin or dichlorohydrin with bisphenols or polyhydric phenols, polyalcohols, polyfunctional halohydrins, and certain polyepoxides. Monoepoxides such as phenyl glycidyl ether are suitable although diepoxides are preferred. The preferred epoxy polymers are produced by coreacting epichlorohydrin or dichlorohydrin with bisphenol-A to provide linear epoxy polymers having pendant epoxide groups. The most preferred epoxy polymers are epichlorohydrin reacted with bisphenol-A. The epoxy polymer can contain between 2 and 25 monomer units and preferably between 3 and 20 copolymerized monomer units (bisphenol-A) wherein the resulting epoxy polymer can be either a mono or diepoxide polymer.

In accordance with one embodiment of this invention, an epoxy resin can be first phosphated by heating a solution of epoxy resin dispersed in a suitable solvent such as methyl ethyl ketone or 2-butoxy ethanol and reacted with phosphoric acid or preferably polyphosphoric acid at reflux temperatures of 120° to 145° C. for sufficient time, typically 2 to 5 hours, to completely react the phosphoric acid with available epoxide groups. Suitable sources of phosphoric acid include 100% orthophosphoric acid, semihydrate or aqueous solutions, and condensed forms of polymeric and partial anhydrides of phosphoric acid such as superphosphoric acid and polyphosphoric acid. The phosphated epoxy polymer contains on an equivalent basis at least about 0.1 equivalent of phosphate per equivalent of epoxide and preferably between about 0.1 to 1 equivalent of phosphate per epoxide equivalent on the epoxy polymer. Thus, a mole of monoepoxide polymer can contain up to about 1 mole of phosphate whereas a mole of a diepoxide polymer can contain up to 2 moles of phosphate. On a weight basis, the phosphated epoxy polymer contains between about 0.05% and 5%, and preferably between 0.1% and 3% coreacted phosphoric acid. Excess molar amounts of phosphate reactant in any appreciable amount is undesirable. The preparation of epoxy phosphate resins are shown in U.S. Pat. No. 4,289,812 and U.S. Pat. No. 4,316,922 and U.S. Pat. No. 4,059,550. In a further variation of this aspect of the invention, epoxy phosphate can be prepared from a single epoxy resin or from a mixture of epoxy resins. In this method, the epoxy phosphate can be produced by reacting a non-phosphated epoxy resin with an epoxy resin containing higher levels of phosphate, provided that the resulting epoxy resin mixture contains between about 0.05% and 5% by weight coreacted phosphoric acid. For instance, a weight ratio of 9 parts non-phosphated epoxy mixed with 1 part phosphated (10%) epoxy resin reacted together at temperatures above 120° C. for at least 2 hours provides an epoxy phosphate containing 1% coreacted phosphoric acid in accordance with this invention. In practice, the epoxy resin is reacted with phosphoric acid at sufficiently high temperatures for time sufficient to form epoxy phosphate esters including desirable monoesters. Preferably, the epoxy phosphate esters are heated in the presence of additional 2% water to convert the epoxy phosphate esters to predominately a monophosphate. The water hydrolyzes the phosphated mixture and preferably converts the mixture to a predominately monophosphated epoxy resin with only minor amounts of di- and tri esters of phosphoric acid remaining.

Referring next to the in-situ polymerization of ethylenically unsaturated monomers in the presence of the phosphated high molecular weight epoxy resin, in-situ polymerization of monomers generally consists of reacting the polymerizable monomers in the presence of the epoxy phosphate so that the reaction product constitutes from about 5% to about 95% of the reaction mixture by weight. The monomers and epoxy are reacted together in the presence of at least 3% of benzoyl peroxide by weight of the monomer, or the free radical initiating equivalent thereof to form an in-situ formed polymer composition comprising epoxy phosphate, addition polymer of copolymerized monomers, and graft copolymer of addition polymer grafted to the epoxy phosphate. The ethylenically unsaturated monomers include carboxyl functional monomers such as acrylic acid and lower alkyl substituted acrylic acids such as methacrylic acid to provide carboxyl functionality means for dispersing the epoxy-acrylic copolymer mixture into water. The preferred acrylic acid is methacrylic acid. The balance of the monomers preferably are nonreactive under the contemplated conditions of polymerization, although small amounts of other reactive monomers may be used such as hydroxy monomers illustrated by 2-hydroxy ethyl methacrylate, amide monomers illustrated by acrylamide, or N-methylol monomers illustrated by N-methylol acrylamide. The remaining monomers are nonreactive monomers illustrated by acrylate and methacrylate esters, such as ethyl acrylate, methyl methacrylate or isobutl methacrylate, styrene, or vinyl toluene, vinyl acetate, vinyl chloride, vinylidene chloride, acrylonitrile, and generally alkyl esters of an acrylic acid, generally the lower alkyl esters, that is, those esters in which the esterifying group contains from 1 to 4 carbon atoms, and particularly ethyl acrylate. Other useful monomers in this class include other $C_{1-15}$ alkyl acrylate esters and methacrylate esters such as, for example, propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Other useful monomers are those readily commercial available monomers having vinyl unsaturation and include styrenic monomers such as styrene, vinyl toluene, divinyl benzene, isoprene and butadiene. The in-situ formed carboxyl-functional polymer can have a molecular weight between 5,000 and 20,000 and preferably between 7,000 and 15,000. The carboxyl content (—COOH) should comprise at least 2% by weight of the monomer mixture and preferably should be over 5%.

The in-situ formed copolymer mixture is prepared by in-situ polymerization of the ethylenic monomer with phosphated epoxy resin to provide a polymeric composition of epoxy phosphate, addition polymer, and graft copolymer. Epoxy phosphate can be heated in a reactor wherein the polymerizable monomer can be added slowly over a period of at least two or three hours along with a solvent and a free radical initiator. Although the reaction may be conducted in the absence of solvent, a solvent system is preferred for the in-situ polymerization of monomers in the presence of epoxy phosphate. A preferred solvent system comprises two miscible solvents, one of which dissolves the phosphated epoxy resin and the other of which dissolves the monomers. The particular solvents satisfactory for the epoxy resin are solvents such as xylene, benzene, ethyl benzene, toluene, and the alkoxy alkanols. For the monomer, alcohols such as methanol, ethanol, propanol, butanol, and the like, are suitable, with butanol being preferred. Ethylene glycol monobutyl ether, ethylene glycol monobutyl ether acetate, and the like, hexane, mineral spirits, and the like, are also suitable. For subsequent dispersion into water, then the solvents selected should be water-soluble materials, as are acetone, butanol, ethanol, propanol, ethylene glycol monoethyl ether, and the like. Ordinarily the amount of solvent may be in the range from about 5% to 30% by weight of the sum of the other components.

In accordance with a preferred aspect of this invention, a high molecular weight epoxy resin is first prepared from liquid epoxy by advancing the molecular weight with Bisphenol-A to obtain high molecular weight epoxy resin, and then coreacting the high molecular weight epoxy resin with ethylenically unsaturated monomers by in-situ polymerization to form an in-situ formed polymeric mixture comprising epoxy-acrylic graft polymer, addition polymer, and ungrafted epoxy resin. Thereafter, the in-situ formed epoxy-acrylic copolymer mixture is phosphated with about 0.1 to 1 equivalent of phosphate per equivalent of epoxide group as described herein previously. With respect to the in-situ polymerization of ethylenically unsaturated monomers in the presence of the high molecular weight epoxy resin, in-situ polymerization of monomers generally consists of reacting the polymerizable monomers in the presence of the epoxy phosphate so that the reaction product constitutes from about 5% to about 95% of the reaction mixture by weight. The monomers and epoxy resin are reacted together in the presence of at least 3% of benzoyl peroxide by weight of the monomer, or the free radical initiating equivalent thereof, to form an in-situ formed polymer composition comprising epoxy resin, addition polymer of copolymerized monomers, and graft copolymer of addition polymer grafted to the epoxy resin in a manner hereinbefore described and set forth in detail in U.S. Pat. No. 4,212,781. The ethylenically unsaturated monomers include carboxyl functional monomers such as acrylic acid and lower alkyl substituted acrylic acids such as methacrylic acid to provide carboxyl functionality means for dispersing the epoxy-acrylic copolymer mixture into water. The preferred acrylic acid is methacrylic acid. The balance of the monomers preferably are non reactive under the contemplated conditions of polymerization, although small amounts of other reactive monomers may be used such as hydroxy monomers illustrated by 2-hydroxy ethyl methacrylate, amide monomers illustrated by acrylamide, or N-methylol monomers illustrated by N-methylol acrylamide. The remaining monomers are nonreactive monomers illustrated by acrylate and methacrylate esters, such as ethyl acrylate, methyl methacrylate or isobutyl methacrylate, styrene, or vinyl toluene, vinyl acetate, vinyl chloride, vinylidene chloride, acrylonitrile, and generally alkyl esters of an acrylic acid, generally the lower alkyl esters, that is, those esters in which the esterifying group contains from 1 to 4 carbon atoms, and particularly ethyl acrylate. Other useful monomers in this class include other $C_{1-15}$ alkyl acrylate esters and methacrylate esters such as, for example, propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Other useful monomers are those readily commercial available monomers having vinyl unsaturation and include styrenic monomers such as styrene, vinyl toluene, divinyl benzene, isoprene nd butadiene. The in-situ formed carboxyl-functional polymer can have a molecular weight between 5,000 and 20,000 and preferably between 7,000 and 15,000. The carboxyl content (—COOH) should comprise at least 2% by weight of the monomer mixture and preferably should be over 5%. The in-situ formed epoxy-acrylic copolymer mixture is then phosphated as described hereinafter.

The in-situ formed epoxy-acrylic copolymer can be phosphated by dispersing the epoxy-acrylic copolymer mixture into a suitable solvent such as methyl ethyl ketone or 2-butoxy ethanol and then reacted with phosphoric acid or preferably polyphosphoric acid at reflux temperatures of 120° C. to 145° C. for sufficient time, typically 2 to 5 hours, to completely react the phosphoric acid with available epoxide groups. Suitable sources of phosphoric acid include 100% orthophosphoric acid, semihydrate or aqueous solutions, and condensed forms of polymeric and partial anhydrides or phosphoric acid such as superphosphoric acid and polyphosphoric acid. The phosphated epoxy acrylic copolymer mixture contains on an equivalent basis at least about 0.1 equivalent of phosphate per equivalent of epoxide and preferably between about 0.1 to 1 equivalent of phosphate per epoxide equivalent on the epoxy polymer. Thus, a mole of monoepoxide can contain up to about 1 mole of phosphate whereas a mole of a diepoxide can contain up to 2 moles of phosphate. On a weight basis, the phosphated epoxy acrylic copolymer contains between about 0.05% and 5%, and preferably between 0.1% and 3% coreacted phosphoric acid based on the epoxy resin content only. Excess molar amounts of phosphate reactant in any appreciable amount is undesirable. In a further variation of this aspect of the invention, the epoxy acrylic copolymer can be reacted with an epoxy resin containing higher levels of phosphate, provided that the resulting resin mixture contains between about 0.05% and 5% by weight coreacted phosphoric acid, based on epoxy resin contained in the mixture. For instance, a weight ratio of 9 parts nonphosphated epoxy contained in the epoxy-acrylic copolymer mixture mixed with 1 part phosphated (10%) epoxy resin reacted together at temperatures above 120° C. for at least 2 hours phosphated epoxy-acrylic copolymer containing 1% coreacted phosphoric acid based on epoxy resin content in accordance with this invention. In practice, the epoxy acrylic copolymer is reacted with phosphoric acid at sufficiently high temperatures for time sufficient to form epoxy phosphate esters including desirable monoesters. Preferably, the epoxy acrylic phosphate esters are heated in the presence of additional 2% water to convert the epoxy-acrylic phosphate esters to predominately a monophosphate. The water hydrolyzes the phosphated mixture and preferably converts the mixture to a predominately monophosphated epoxide groups with only minor amounts of di- and tri-esters of phosphoric acid remaining.

In practice, the high molecular weight epoxy phosphate or epoxy resin and the mixture of polymerizable monomers are reacted together in the presence of a free radical initiator, preferably of the peroxide type, and benzoyl peroxide is most preferred. Typical and useful free radical initiators include cumene hydroperoxide, benzoyl peroxide, t-butyl perbenzoate, t-butyl peroxide, lauroyl peroxide, methyl ethyl ketone peroxide, chlorobenzoyl peroxide, and the like. Benzoyl peroxide is preferred. The amount of catalyst should be at least 3%, and preferably more than 4% by weight of benzoyl peroxide or the equivalent, based on monomer weight. The reaction temperature preferably is maintained in the range from about 80° C. to about 130° C., although the temperature may be adjusted within a relatively wide range to accommodate the reactivity of the mixture. Thus, operating temperatures in the range from about 30° C. to about 200° C. are feasible, depending upon the end results and operating conditions selected. After the monomers are added, the reaction mixture is normally held for up to three hours at reaction temperature to complete the monomer conversion. The in-situ polymerization of the monomers produces an in-situ formed carboxyl functional addition polymer containing at least about 20% of polymerized monoethylenically unsaturated carboxylic acid monomer based on the total weight of monomers.

The phosphated epoxy-acrylic copolymer mixture comprises by weight between 10% and 90% of phosphated epoxy resin. This mixture can then be mixed up to about 10% by weight aminoplast cross-linking resin. Aminoplasts are melamine or melamine derivatives such as methylol melamine or similar alkylated melamine formaldehyde resins. Aminoplasts further include benzoguanamine, acetoguanamine, as well as ureaformaldehyde. Commercially available aminoplasts which are water-soluble or water-dispersible for the instant purpose include Cymel 301, Cymel 303, Cymel 370, and Cymel 373 (all being products of American Cyanamid, Stamford, Conn., said aminoplasts being melamine based, e.g., hexamethyoxy-methyl melamine for Cymel 301), and Beettle 80 (products of American Cyanamid which are methylated or butylated ureas.) Other suitable aminoplast resins are of the type produced by the reaction of aldehyde and formal guanamine; ammeline; 2-chloro-4,6-diamine-1,3,5-triazine; 2-phenyl-p-oxy-4,6-diamino-1,3,5-triazine. The mono, di-, or tri-aryl melamines, such as 2,4,6-triphenyl-triamino-1,3,5-triazine, are preferred. Other aldehydes used to react with the amino compound to form the resinous material are crotonic aldehyde, acrolein, or compounds which generate aldehydes, such as hexamethylene-tetramine, paraldehyde, and the like.

The phosphated epoxy-acrylic copolymer composition produced in accordance with this invention is particularly useful as a binder polymer for coatings or as an additive to other polymer systems used as binders in protective coatings. For instance, the phosphated epoxy-acrylic copolymer provides an excellent wetting agent in water based binder systems and particularly spray application system. The phosphated epoxy-acrylic copolymer composition was found to provide a substantial improvement over conventional low molecular weight acrylic copolymer wetting agents by substantially improving the blister resistance as well as providing improved wetting characteristics to metal substrates.

Still another particularly desirable aqueous coating composition useful as an interior coating for metal cans can be produced by mixing the epoxy-acrylic copolymer mixture with a self-curing alkyloyl acrylamide latex such as shown in commonly assigned U.S. Ser. No. 416,911 filed Sept. 13, 1982 to produce an excellent sprayable coating composition for interior cans. The reactive self-curing latex polymer is an emulsion polymer of copolymerized ethylenically unsaturated monomers comprising (i) reactive carboxyl, hydroxyl, amine or amide monomers, (ii) alkylol acrylamide and preferably alkylated alkylol acrylamide monomers, and (iii) other ethylenically unsaturated monomers. The self-curing latex is synthesized by step-wise polymerization of monomers in water by first polymerizing a portion of the ethylenic monomers and subsequently polymerizing the remaining monomers including the alkylol acrylamide monomers in the second polymerization step to produce core-shell polymer particles wherein the shell preferentially contains polymerized alkylol acrylamide monomer whereby alkylol acrylamide is preferentially orientated on the surface of the core-shell latex polymer particles. The two stage monomers can be proportioned on a weight basis from 25/75 to 75/25 first stage/second stage monomers. The alkylated alkylol acrylamide monomers can be derivatives of acrylamide, methacrylamide, methylol acrylamide, or similar alkyl modified acrylamide monomer as shown for example in U.S. Pat. Nos. 3,991,216; 4,097,438; and 4,305,859. The acrylamide monomers preferably are alkylated with an alkyl group such as methyl, ethyl, propyl, n-butyl, or iso-butyl, and similar alkylated alkylol acrylamide monomers, wherein the butylated monomers are preferred. Functional monomers include carboxyl, hydroxyl, amino and amido functional group containing monomers. Carboxyl containing monomers include acrylic acid and lower alkyl substituted acrylic acids wherein the preferred carboxylic monomers are acrylic and methacrylic acids. Hydroxyl containing monomers are hydroxy containing ethylenically unsaturated monomers including hydroxy alkyl acrylates such as 2-hydroxy ethyl acrylate and methacrylate, 2-hydroxypropyl acrylate and methacrylate, and similar hydroxy alkyl acrylates. Amido containing monomers include acrylamide and methacrylamide or similar alkyl alkylol acrylamide monomers. Other reactive monomers include N-methylol acrylamide or methacrylamide monomers. The remaining monomers that can be copolymerized with the alkylol acrylamide monomer and functional monomers to form a reactive self-curing latex polymer are ethylenically unsaturated monomers including vinyl monomers, for example, vinyl esters such as vinyl acetate, vinyl proprionate, vinyl butyrates, vinyl benzoate, isopropenyl acetate and similar vinyl esters; and vinyl halides such as vinyl chloride. Other ethylenically unsaturated monomers can include, for example, those monomeric materials exhibiting ethylenic double bond unsaturation such as polymerizable allylic, acrylic, fumaric, maleic, or like ethylenically unsaturated double bond functionality. Ethylenically unsaturated monomers can include for example, styrene, methyl styrenes and similar alkyl styrenes, chlorostyrene, vinyl toluene, vinyl naphthalene, divinyl benzene, diallyl phthalate and similar diallyl derivatives, butadiene, alkyl esters of acrylic and methacrylic acid and similar ethylenically unsaturated monomers. Further suitable ethylenically unsaturated monomers include acrylic unsaturated monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hyroxyl alkyl acrylates and methacrylates such as hydroxyethyl and hydroxypropyl acrylates and methacrylates, as well as amino acrylates and methacrylates. In preparing the reactive self-curing latex copolymer, the ethylenically unsaturated monomers copolymerized in water by two step polymerization described above through free radical induced polymerization using peroxy or azo catalysts, common redox catalysts, ultraviolet radiation or the like. Free radical initiators also include various peroxygen compounds such as persulfates, benzoyl peroxide, t-butyl hydroperoxide, cumene hydroperoxide, and similar peroxide catalysts; and azo compounds such as azo bis-isobutyronitrile and dimethylazobis-isobutyrate. Initiating systems further include alkali metal persulfate or ammonium persulfate with or without a reducing substance adapted to activate the persulfate. The initiators or catalysts ordinarily are used at a level of about 0.1% to 1% by weight of monomers. The resulting self-curing water dispersed latex polymer contains by weight between 1% and 20% copolymerized alkylol acrylamide monomer, between 1% and 20% reactive carboxyl, hydroxyl, amine or amide monomer, and other ethylenically unsaturated monomer.

The highly desirable sprayable coating composition produced by mixing the phosphated epoxy-acrylic copolymer composition of this invention with the self-curing latex can contain between 20 and 60% self-curing latex with the balance being in the phosphated epoxy-acrylic copolymer to form a matrix polymer composition for surface coatings. The foregoing matrix polymer compositions can be mixed with a water-dispersible cross-linking component generally referred to as aminoplast resins adapted to heat cure and cross-link with the carboxyl functionality of epoxy-acrylic copolymer mixture. On a polymer weight basis, the coating composition contains between 0% and 15% But preferably between 1% and 10% aminoplast cross-linking resin mixed with between 85% and 100% of the above indicated matrix polymer mixtures.

The water-dispersed coating compositions can be produced by mixing together the various water-dispersed polymers. The aminoplast polymer can be dispersed into water by mechanical mixing. The copolymer mixture of addition carboxyl polymer and epoxy phosphate are prepared in solvent and then subsequently dispersed into water using a fugitive base such as primary, secondary, and tertiary alkyl, alkanol, aromatic amines, or alkanolalkyl mixed amines such as mono-ethanol amine, dimethyl ethanol amine, diethanol amine, triethyl amine, dimethyl aniline, ammonium hydroxide, and the like, as more particularly described in U.S. Pat. No. 4,212,781. The amount of water contained in the coating composition depends on the viscosity desired, which in turn, relates to the method of application. For spraying, preferably the coating composition contains between about 10% and 30% by weight polymeric solids relative to 70% to 90% water including other volatiles such as minor amounts of solvent. For applications other than spraying, the aqueous polymeric dispersions can contain between about 10% and 40% by weight water. Organic solvents can be utilized to facilitate spray or other applications methods and such solvents include n-butanol, 2-butyoxy-ethanol, xylene, toluene, and preferably n-butanol is used in combination with 2-butoxy-ethanol.

The coating composition can be pigmented and/or opacified with known pigments and opacifiers. For many uses, including food uses, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 95° C. to about 235° C. or higher for time sufficient to effect complete curing as well as volatilizing of any fugitive component therein. Upon heat curing, the reactive self-curing latex is believed to become reactive and self-curing wherein the alkyl chain of the alkoxy acylamide splits from the alkylol acrylamide chain whereby the acrylamide chain of the latex polymer reacts with the functional monomer groups of carboxyl, hydroxyl, or amido groups, or can react with the carboxyl functionality in the epoxy-acrylic copolymer mixture as well as the aminoplast cross-linking resin.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied can be as thick as 0.1 to 1 mil.

For a better understanding of the present invention, the following examples are provided. In this application, all parts are parts by weight, all percentages are weight percentages, and temperatures are degree Centigrade unless otherwise expressly noted.

EXAMPLE 1

An epoxy phosphate acrylic copolymer was made as follows. 1141 gms. of 95% Epon 828 in xylene, 614 gms. of bisphenol A, and 310 gms. of 2-butoxy ethanol was charged into a 5 l. flask equipped with a stirrer, a thermometer, a $N_2$ inlet, a condenser and additional funnel. The mixture was heated to 90° C. with $N_2$ sparge, when the temperature was at 90° C., a mixutre of 0.52 gm. of sodium acetate and 3 gms. of water was added, and the heat was continued to gain 140° C. When the temperature reached 140° C., the heat was turned off. The exotherm raised the temperature to 160° C. The heat was turned back on to raise the temperature to 175° C. The reaction mixture was held at 175° C. for five hours and cooled down to 125° C. by adding 360 gms. of 2-butoxy ethanol. When the temperature was at 125° C., a mixture of 7.32 gm. of polyphosphoric acid and 20 gms. 2-butoxy ethanol was added slowly and held for 30 minutes. Thirty-four gms. of water was then added slowly to the reaction mixture and held at 125° C. for two hours. After the two hours hold, 888 gms. of BuOH was added to the reaction mixture and the temperature was dropped to 113° C. A mixture of 283 gms. of methacrylic acid, 148 gms. of styrene, and 4 gms. of ethyl acrylate, 38.5 gms. of benzoyl peroxide and 32.4 gms. of 2-butoxy ethanol was added over two hours and then the reaction mixture was held at 114° C. for additional two hours. The resulting resin was then dropped into the mixture of 3867 gms. of DI water and 162 gms. of dimethyl ethanolamine. The resulting emulsion was a stable opalescent emulsion which gave a good protective coating for steel cans in softdrink application when cured with 5% Cymel 303.

EXAMPLE 2

In a manner similar to Example 1, 562.5 grams of 2-butoxy ethanol was charged into a 5 L flask equipped with a stirrer, a thermometer, an $N_2$ inlet, a condenser and additional funnel. The liquid was then heated to 120° F. and 562.5 grams of Epon 1007F was added slowly. When the solid was all dissolved, a mixture of 3.69 gms. of polyphosphoric acid and 33.2 grams of 2-butoxy ethanol was added slowly over 30 minutes. The reaction mixture was held at 120° C. for 45 minutes. 11.25 grams of deionized water was then added slowly to the reaction mixture and held at 122° C. for 1.5 hours. After the hold, the temperature was lowered to 115° C. A mixture of 93.7 grams of methacrylic acid, 49 grams of styrene and 1.3 grams of ethyl acrylate, 12.75 gms. of benzoyl peroxide, and 18.6 gms. of butanol was added over 1.5 hours and then the reaction mixture was held at 115° C. for an additional 2.5 hours. The resulting resin was then dropped into the mixture of 144.8 gms. of deionized water and 69.3 gms. of dimethyl ethanolamine. One hundred thirty-four gms. of deionized water was then added to adjust the solid content to 24%. The resulting emulsion was a stable opalescent emulsion which gave a good protective coating for steel cans in soft drink applications when cured with 5% Cymel 303.

EXAMPLE 3

In a manner similar to Examples 1 and 2, 600 gms. of DER-333, 316 gms. of bisphenol A, and 160 gms. of 2-butoxy ethanol was charged into a 5 L flask equipped with a stirrer, a thermometer, and $N_2$ inlet, a condenser and additional funnel. The mixture was heated to 140° C. When the temperature reached 140° C., the heat was turned off, the exotherm raised the temperature to 165° C. The heat was turned back on to raise the temperature to 175° C. The reaction mixture was held at 175° C. for 3 hours and cooled down to 132° C. by adding 537.5 gms. of 2-butoxy ethanol. When the temperature was at 133° C., 1015.9 gms. of Epon 1007F was added and mixed completely, then 211.4 gms. of Solution A (identified hereafter) was added slowly over 30 minutes. The reaction mixture was held at 130° C. for 1.5 hours. After the hold, 22.5 gms. of water was added slowly and continued to hold at 130° C. for an additional 1.5 hours. During the hold, 62.8 gms. of water and solvent was driven off. After the hold, the temperature was lowered to 115° C. and a mixture of 148.0 gms. of methacrylic acid, 77.1 gms. of styrene, 2.0 gms. of ethyl acrylate, 19.8 gms. of benzoyl peroxide and 57.9 gms. of 2-butoxy ethanol was added over 1 hour. When the addition was finished, the reaction mixture was held at 115° C. for 3 hours.

After the hold, 903 gms. of butanol was added and mixed for 15 minutes. About 2436 gms. of the resulting resin was dropped into a mixture of 3405.6 gms. of deionized water, 70.1 gms. of dimethyl ethanolamine and 88.6 gms. of 2-butoxy ethanol. The resulting emulsion was a stable opalescent emulsion which gave a good protective coating for steel cans in soft drink application when cured with 5% Cymel 303.

Solution A

Seven hundred thirty-five gms. of methyl ethyl ketone was charged into a 5 L flask equipped with a thermometer, additional funnel, and a stirrer. The solvent was heated to 70°–80° F. and 1126 gms. of Epon 1001 B-80 was added and mixed well. Ninety-nine gms. of 85% phosphoric acid was added over 1.5 hours and the temperature maintained at 80°–115° F. When the addition was over, the temperature was raised to reflux (175° F.). The reaction mixture was held at reflux for 4.5 hours and cooled down to room temperature. This Solution A was used above to form the epoxy phosphate ester.

EXAMPLE 4

A phosphated epoxy-acrylic copolymer mixture was prepared from 816 gms. of DER 333, 384 gms. of Bisphenol-A, and 163 gms. of butyl cellosolve charged into a 5 L flask equipped with a stirrer, and thermometer a $N_2$ inlet, a condenser and addition funnel. The mixture was heated to gain 140° C. When the temperature was at 140° C., the heat was turned off. The exotherm raised the batch temperature to 178° C. The reaction mixture was cooled to 175° C. and held at 175° C. for 2½ hours to obtain an oxirane value of 0.86%. The mixture was then cooled down to 115° C. by adding 233 gms. of butyl cellosolve. When the temperature was at 115° C. a mixture of 19.28 gms. of ethyl hexyl acrylate, 0.5 gms. of methyl methacrylate, 5.26 gms. of acrylic acid and 2.24 gms. of benzoyl peroxide was added over 20 minutes. After the monomer mix was added, 16.7 gms. methyl amyl ketone was added to rinse the addition funnel. The reaction mixture was slowly upheated to 125° C. When the temperature was at 125° C., 1.28 gms. of superphosphoric acid was added over 25 minutes and followed by 80.3 gms. of butyl cellosolve to rinse out the addition funnel. The reaction mixture was held at 125° C. for 3 hrs. to complete the reaction. After the 3 hour hold, 20.2 gms. of water was added and the temperature was maintained at 125° C. for another 3 hours. The resulting resin was then dropped into a mixture of 2257 gms. of water and 23.9 gms. of DMEA to obtain a stable opalescence emulsion which provided a good additive to aqueous dispersed polymers to provide an improved wetting characteristic for interior can coating.

What is claimed is:

1. In a process for polymerizing ethylenically unsaturated monomers in the presence of epoxy resin, the improvement comprising:

reacting an epoxy resin having epoxide groups and having a molecular weight between about 350 and 20,000 with a source of phosphoric acid selected from 100% ortho phosphoric acid, aqueous phosphoric acid or polyphosphoric acid to coreact phosphoric acid with the epoxy resin epoxide groups to produce a phosphated epoxy polymer containing by weight between about 0.5% and 5% coreacted phosphoric acid;

polymerizing ethylenically unsaturated monomers, at least one being a carboxyl functional monomer, in the presence of said phosphated epoxy polymer and in the presence of at least 3% by weight of benzoyl peroxide based on the weight of ethylenically unsaturated monomers, or under equivalent free radical initiating conditions using a peroxide initiator, at temperatures between about 80° C. and 130° C., to provide an in-situ formed polymerization product comprising on a weight basis between about 10% and 90% phosphated epoxy polymer, and the remaining being carboxyl functional addition polymer of polymerized monomers wherein the acid functionality of the addition polymer is sufficiently high to render the polymerization product water dispersible.

2. The process in claim 1 wherein the phosphated epoxy resin is produced by reacting a non-phosphated epoxy with an epoxy phosphate containing above 5% phosphate for time sufficient whereby the resulting phosphated epoxy resin contains between 0.05% and 5% by weight coreacted phosphoric acid.

3. The process in claim 1 wherein the phosphated epoxy resin contains between about 0.1% and 3% by weight coreacted phosphoric acid.

4. The process in claim 1 wherein a base ionizing agent ionizes the acid-functional addition polymer, and said in-situ formed polymerization product is dispersed into water.

5. The process in claim 1 wherein the ethylenically unsaturated monomers include at least 20% by weight carboxyl functional monomer.

6. The process in claim 4 wherein the carboxyl functional monomer comprises an acrylic acid.

7. The process in claim 4 wherein the carboxyl functional monomer comprises a methacrylic acid.

8. The process in claim 1 wherein the ethylenically unsaturated monomers comprise styrene and acrylic or methacrylic acid.

9. The process in claim 7 wherein the ethylenically unsaturated monomers further include a lower alkyl ester of acrylic or methacrylic acid.

10. The process in claim 1 wherein the acid no. of the in-situ formed polymerization product is between 30 and 220.

11. The process in claim 1 wherein the benzoyl peroxide is at least 4% by weight based on monomer weight or under equivalent free radical initiating conditions using a peroxide initiator.

12. The process in claim 1 wherein the benzoyl peroxide level is at least 6% by weight of monomers.

13. The process in claim 1 wherein the in-situ formed polymerization product includes a graft-epoxy polymer component formed by grafting between said addition polymer component and said phosphated epoxy polymer component.

14. The process in claim 13 wherein the epoxy resin has aliphatic backbone carbons and grafting is onto the aliphatic backbone carbon atoms of the epoxy resin.

15. The process in claim 1 wherein the epoxy resin comprises bisphenol-A reacted with epichlorohydrin.

16. A phosphated epoxy-acrylic composition comprising the reaction product of:

an epoxy polymer having a molecular weight between about 350 and 20,000 coreacted with ethylenically unsaturated monomers, at least one being a carboxyl monomer by in-situ polymerization of the monomers in the presence of phosphated epoxy polymer with at least 3% by weight of benzoyl peroxide based on the weight of monomers, or under equialent free radical initiating conditions using peroxide initiator, at temperatures between about 80° C. and 130° C., said epoxy coreacted with about 0.05% and 5% phosphoric acid selected from 100% ortho phosphoric acid, aqueous phosphoric acid or polyphosphoric acid phosphate based on epoxy resin to provide phosphated epoxy-acrylic reaction product containing by weight between 10% and 90% phosphated epoxy.

17. The phosphated epoxy-acrylic composition in claim 16 wherein the reaction product comprises epoxy phosphate and addition copolymer.

18. The phosphated epoxy-acrylic composition in claim 16 wherein the reaction product comprises epoxy phosphate, addition copolymer, and graft epoxy phosphate of addition polymer grafted to the epoxy phosphate.

19. The phosphated epoxy-acrylic composition in claim 16 wherein the epoxy phosphate contains 0.1% to 3% by weight coreacted phosphate.

20. The phosphated epoxy-acrylic composition in claim 16 ionized with ionizing base and dispersed into water.

21. The phosphated epoxy-acrylic composition in claim 16 wherein the polymerized addition polymerizable monomer comprises by weight 20% of an acrylic acid.

22. The phosphated epoxy-acrylic composition in claim 21 wherein the acrylic acid is selected from acrylic acid or methacrylic acid.

23. The phosphated epoxy-acrylic composition of claim 21 wherein the copolymerized polymerizable monomers include a minor amount of a lower alkyl ester of acrylic or methacrylic acid.

24. The phosphated epoxy-acrylic composition in claim 16 wherein a phosphated epoxy resin is preformed and coreacted with said ethylenically unsaturated monomers by in-situ polymerization to form said phosphated epoxy-acrylic composition.

25. The phosphated epoxy-acrylic composition in claim 16 wherein a preformed mixture comprising in-situ polymerization of said ethylenically unsaturated monomers in the presence of epoxy resin is coreacted with phosphate.

26. In a process for producing a phosphated epoxy-acrylic cmposition, the process comprising:
polymerizing ethylenically unsaturated monomers, at least one being a carboxyl functional monomer, in the presence of epoxy resin having epoxide groups and having a molecular weight between about 350 and 20,000 and in the presence of at least 3% by weight of benzoyl peroxide based on the weight of ethylenically unsaturated monomers, or under equivalent free radical initiating conditions using a peroxide initiator, at temperatures between about 80° C. and 130° C., to provide a preformed in-situ polymerization product comprising on a weight basis between about 10% and 90% epoxy resin, and said preformed polymerization product containing carboxyl functionality sufficiently high to render the preformed polymerization product water dispersible, said preformed polymerization product coreacted with a source of phosphoric acid selected from 100% ortho phosphoric acid, aqueous phosphoric acid, or polyphosphoric acid to coreact phosphoric acid with the epoxy resin epoxy groups to produce a phosphated epoxy polymer containing by weight between about 0.05% and 5% co-reacted phosphoric acid.

27. The process in claim 26 wherein the phosphated epoxy acrylic composition is produced by reacting a non-phosphated epoxy with an epoxy phosphate containing above 5% phosphate for time sufficient whereby the resulting phosphated epoxy resin contains between 0.05% and 5% by weight coreacted phosphoric acid.

28. The process in claim 26 wherein the phosphated epoxy acrylic composition contains between about 0.1% and 3% by weight coreacted phosphoric acid.

29. The process in claim 26 wherein a base ionizing agent ionizes the carboxyl functionality, and said preformed in-situ polymerization product is dispersed into water.

30. The process in claim 26 wherein the ethylenically unsaturated monomers include at least 20% by weight carboxyl functional monomer.

31. The process in claim 29 wherein the carboxyl functional monomer comprises an acrylic acid.

32. The process in claim 29 wherein the carboxyl functional monomer comprises a methacrylic acid.

33. The process in claim 26 wherein the ethylenically unsaturated monomers comprise styrene and acrylic or methacrylic acid.

34. The process in claim 32 wherein the ethylenically unsaturated monomers further include a lower alkyl ester of acrylic or methacrylic acid.

35. The process in claim 29 wherein the acid no. of the in-situ formed polymerization product is between 30 and 220.

36. The process in claim 26 wherein the benzoyl peroxide is at least 4% by weight based on monomer weight or under equivalent free radical initiating conditions using a peroxide initiator.

37. The process in claim 26 wherein the benzoyl peroxide level is at least 6% by weight of monomers.

38. The process in claim 26 wherein the preformed in-situ polymerization product includes a graft-epoxy polymer component formed by grafting between said addition polymer component and said epoxy resin component.

39. The process in claim 38 wherein the epoxy resin has aliphatic backbone carbons and grafting is onto the aliphatic backbone carbon atoms of the epoxy resin.

* * * * *